(12) United States Patent
Roy et al.

(10) Patent No.: US 10,996,993 B2
(45) Date of Patent: May 4, 2021

(54) ADAPTIVE WORK DISTRIBUTION IN DISTRIBUTED SYSTEMS

(71) Applicant: Western Digital Technologies, Inc., San Jose, CA (US)

(72) Inventors: Souvik Kumar Roy, Bangalore (IN); Ameet Pyati, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 82 days.

(21) Appl. No.: 16/447,542

(22) Filed: Jun. 20, 2019

(65) Prior Publication Data

US 2020/0401458 A1  Dec. 24, 2020

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4887* (2013.01)

(58) Field of Classification Search
None
See application file for complete search history.

(56) References Cited

U.S. PATENT DOCUMENTS

| | | | |
|---|---|---|---|
| 9,170,849 B2 | 10/2015 | Calder et al. | |
| 9,552,226 B1* | 1/2017 | Norbeck, Jr. et al. | G06F 9/5072 |
| 9,602,423 B2 | 3/2017 | Suchter et al. | |
| 2002/0178297 A1* | 11/2002 | Lister et al. | G06F 9/5061 719/310 |
| 2005/0125557 A1 | 6/2005 | Vasudevan et al. | |
| 2014/0245298 A1 | 8/2014 | Zhou et al. | |

OTHER PUBLICATIONS

Wikipedia Page, Apache Hadoop, pp. 1-13, Retrieved May 24, 2019; https://en.wikipedia.org/wiki/Apache_Hadoop.
Wikipedia Page, Apache Spark, pp. 1-5, Retrieved Jun. 3, 2019; https://en.wikipedia.org/wiki/Apache_Spark.

\* cited by examiner

*Primary Examiner* — Gregory A Kessler
(74) *Attorney, Agent, or Firm* — Patent Law Works LLP

(57) ABSTRACT

These methods, systems, and other aspects can provide for adaptive distribution/re-distribution of data processing tasks. An example method may create, by a processor in a first node, a status object for a data processing task and assign, by the processor in the first node, the data processing task to a worker of a second node. Further, after a first period of time, the method may query, by the processor in the first node, the status object for a task status of the assigned data processing task reported by the second node. The task status reflects a status of execution of the assigned data processing task by the second node. The method determines, by the processor in the first node, to reassign the assigned data processing task based on a received task status reported by the second node, and reassign, by the processor in the first node, the assigned task.

20 Claims, 7 Drawing Sheets

700

| <Start-Marker= " " ><br><Current-Marker= ><br><End-Marker= "a" > | Beginning |
|---|---|

Fixed Limit

| <Start-Marker= " " ><br><Current-Marker= "a" ><br><End-Marker= "a" > | Completely Done |
|---|---|
| <Start-Marker= " " ><br><Current-Marker= "ab" ><br><End-Marker= "a" > | Partially Done |
| <Start-Marker= " " ><br><Current-Marker=><br><End-Marker= "a" > | Abandoned |

ADAPTIVE WORK DISTRIBUTION IN DISTRIBUTED SYSTEMS

BACKGROUND

The present disclosure relates to computing systems. In a more particular example, the present disclosure relates adaptive distribution/re-distribution of data processing tasks among distributed system nodes.

In distributed systems, work or task distribution among a set of processes/system nodes is widely used. Usually, an assigning component (or assignor) generates a set of tasks and then distributes the generated tasks to the set of system nodes (or workers) spread across a cluster of systems. Workers attempt to finish the tasks and then inform back the assignor. Assignor marks a task as "DONE" and moves forward. In a failure path, either a worker informs the assignor about the failure or the assignor considers the task as "FAILED" if it does not receive any indication from the worker. In the next attempt, assignor reassigns the "FAILED" task to another worker to restart the process.

In the existing technologies, even a partially done task in the system needs to restart the whole process from the beginning. This wastes the previous processing of the partially done task. Accordingly, the current task distribution/re-distribution process is not optimal for task distribution, especially for the partially done task re-distribution.

SUMMARY

The present disclosure relates to methods and systems for adaptive distribution/re-distribution of data processing tasks among a plurality of distributed system nodes.

The present disclosure includes, but is not limited to, the following aspects. According to one innovative aspect, a method includes may create, by a processor in a first node, a status object for a data processing task and assign, by the processor in the first node, the data processing task to a worker of a second node. Further, after a first period of time, the method may query, by the processor in the first node, the status object for a task status of the assigned data processing task reported by the second node. The task status reflects a status of execution of the assigned data processing task by the second node. The method determines, by the processor in the first node, to reassign the assigned data processing task based on a received task status reported by the second node, and reassign, by the processor in the first node, the assigned task.

According to another innovative aspect, a distributed system, a cluster of nodes that includes a first node and a second node, and a task distribution manager associated with the first node. The second node includes a worker configured to perform data processing tasks. The task distribution manager is configured to create a status object for a task; assign the task to the worker of the second node; and after a first period of time, query the status object for a task status of the assigned task reported by the second node. The task status reflects a status of execution of the assigned task by the second node. The task distribution manager is configured to determine to reassign the assigned task based on a received task status reported by the second node; and reassign the assigned task.

According to a further innovative aspect, a system comprising means for creating a status object for a task; means for assigning the task to a worker of a system node; and means for querying the status object for a task status of the assigned task reported by the system node after a first period of time. The task status indicates a status of execution of the assigned task by the system node. The system also includes means for determining to reassign the assigned task based on a received task status reported by the system node; and means for reassigning the assigned task.

These and other implementations may each optionally include one or more of the following features: that the status object for the task includes a start marker, a current marker, and an end marker for the task; that the start marker is an empty string that indicates where the assigned task starts, the current marker indicates a point to which the worker has done the task when the status object is queried, and the end marker indicates an end offset of the task; that the task status of the assigned task is determined based on a comparison of the current marker and the end marker after the first period of time; that, to reassign the assigned task, a copy of the assigned task is regenerated, wherein a start marker for the regenerated copy of the assigned task is set to the current marker of the assigned task after the first period of time; that the task distribution manager is further configured to create a unique task identifier for the assigned task, and create a lease object that includes the task identifier in a prefix of the lease object; that the task distribution manager is further configured to periodically override the lease object to advertise a liveliness of the task distribution manager to the second node; that the lease object and status object are 0-byte objects stored in an object store; that, to query the status object for the task status of the assigned task reported by the second node, the task distribution manager is further configured to periodically check a latest modification of the status object that has been periodically modified by the second node; and that the task distribution manager is further configured to assign a second task to the worker of the second node after assigning the task to the worker of the second node.

One or more embodiments of the present disclosure as disclosed herein may provide a number of technical features and advantages, including but not limited to the following.

(1) Improved adaptiveness of task distribution in the case of a partially done data processing task. The present disclosure improves system performance by reassigning partially done tasks, to allow a partially done task to resume the processing from the point where the previous processing ends, rather than from the beginning of the task (per conventional systems). By using the adaptive distribution described in the present disclosure, a distributed system may avoid repeated processing of a previously processed portion of a task, which saves the processing resources of the distributed system.

(2) Improved efficiency in handling a large list of tasks and long duration tasks. For a large list of tasks or long duration tasks, they generally take a longer time to complete. Accordingly, when a processing unit reaches a certain limit and stops processing tasks, the large list of tasks and long duration tasks will more likely face a risk of not being completely processed, and thus end with the tasks being partially done. Since these tasks generally take longer time and more resources to process even a portion of the tasks, resuming the task processing of these tasks by restarting from the fresh will leave the previous processing wasted, which is really undesirable, especially when there is a large number of tasks waiting for processing (e.g., during data restore or recovery after failure of storage nodes). By using the adaptive distribution in the present disclosure, it can be ensured that the previous processing of a task is not wasted, and thus time and resources may be saved in processing these tasks.

(3) Improved efficiency for a worker to handle assigned tasks. By enabling more than one task, instead of only one task (per conventional systems), to be processed simultaneously in an individual worker, the efficiency of an individual worker is greatly improved.

Other implementations of one or more of these aspects include corresponding systems, apparatus, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Novel data processing technology, such as but not limited to systems, devices, and methods, and other aspects, for using a status object in tracking and reassigning a data processing task in a distributed system, is disclosed. While this technology is described below in the context of a particular system architecture in various circumstances, it should be understood that the systems and methods can be applied to other architectures and organizations of hardware. More specifically, it should be noted that while the following description is made with reference to certain embodiments, the present disclosure may apply to any known or contemplated distributed system that implements an adaptive distribution/re-distribution of data processing tasks among a plurality of system nodes or processing units.

According to some embodiments, novel data processing technology disclosed herein may be applied to object restore that aims to bring back all the "intended" objects (e.g., replicated objects for backup storage) from remote system (e.g., remote storage nodes or buckets) to the local system (e.g., local storage nodes or buckets) after certain local storage nodes fail. Under certain circumstances, the remote buckets can have a very large number of "intended" objects. Identification and pulling back the "intended" objects may take significant time and computing power (e.g., requiring a large number of system nodes/processing units). However, work effort and time on the system nodes/processing units generally can't be pre-estimated. Hence, system nodes/processing units may stop working on an object restore-related task after a certain limit is reached, which leaves certain tasks partially done. Novel technology disclosed herein may be adaptive to the partially done tasks and redistribute these tasks among the system nodes by including certain markers to inform the system nodes to resume processing the partially done tasks from where the previous processing stops, instead of from the beginning of these tasks as the conventional systems do. The novel technology disclosed herein may improve the efficiency of processing object restore-related tasks.

Figure 1:
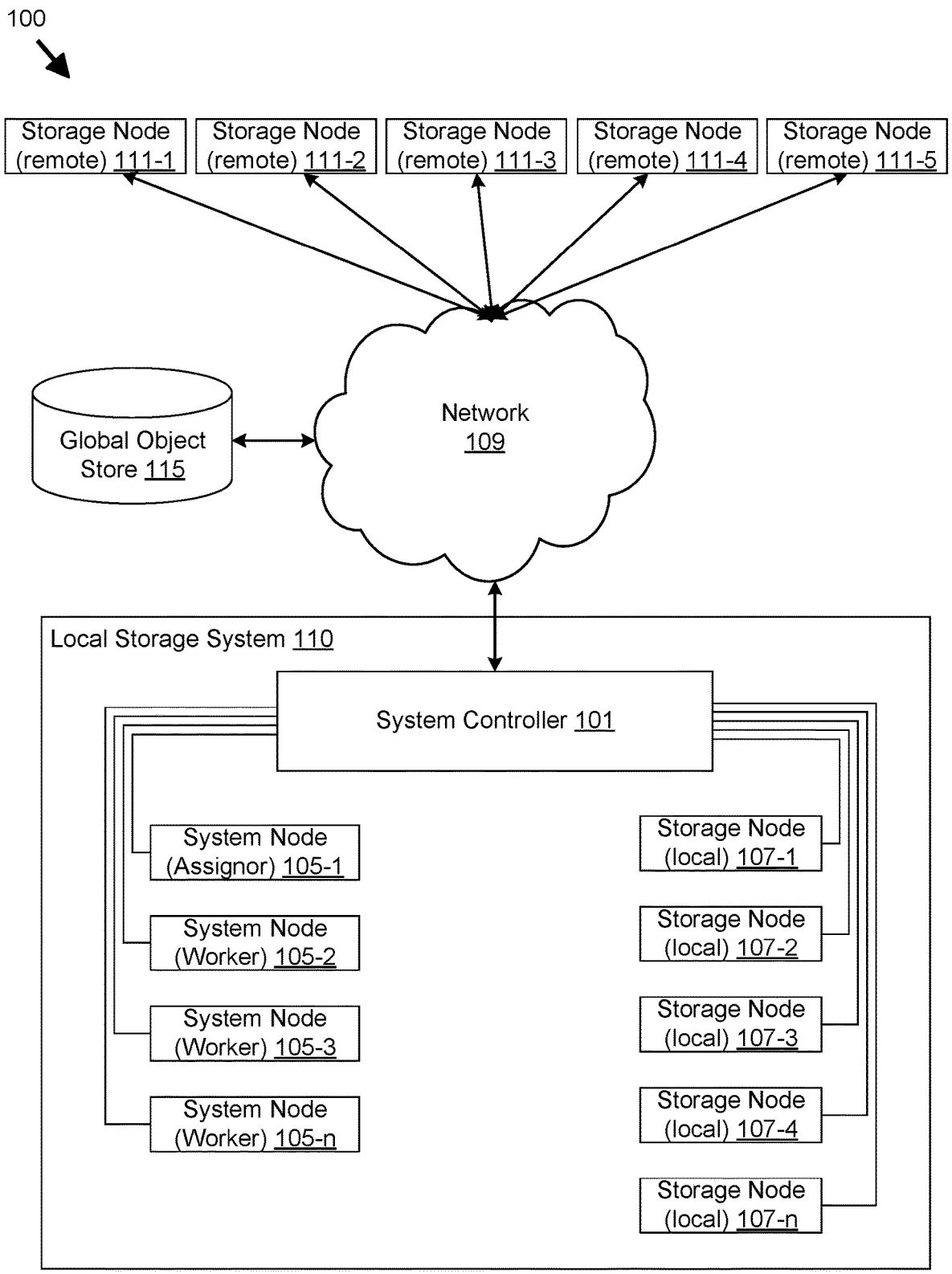
FIG. 1 depicts a block diagram of an example computing system including a local storage system and a plurality of remote storage nodes.

FIG. 1 depicts a block diagram of an example computer system 100 for adaptive task distribution/re-distribution. The computer system 100 includes a plurality of remote storage nodes 111-1 to 111-n (together may be referred to as remote storage nodes 111) and a local storage system 110. The local storage system 110 includes a cluster of system nodes 105-1 to 105-n and a plurality of storage nodes 107-1 to 107-n. The local storage system 110 may communicate with the remote storage nodes 111 via a network 109 for data transfer between the local storage system and the remote storage nodes. In some embodiments, the computer system 100 may also include an object store 115, for storing objects used by the local storage system 110 in task distribution/re-distribution. The object store also connects to the local storage system 110 via the network 109. As described in detail below with reference to FIGS. 2-7, the computer system 100 may be used in connection with a method for using status object and lease object in tracking and adaptively re-distributing a data processing task in a distributed system.

It should be understood that a system 100 may comprise a local system including a plurality of nodes, a distributed system, a system of remote notes, a combination of the foregoing, etc., depending on the embodiment.

In the present disclosure, a "data processing task" may refer to any sequence of operations (e.g., a "job," a "process," etc.) that involve the transfer and/or processing of data stored in storage devices or systems. Examples of data processing tasks include, but are not limited to, data manipulation operations (reads, writes, updates, deletions, etc.), data partitioning, data restore and recovery, data compression and decompression, data encryption and decryption, reformatting, etc.

The remote storage nodes 111 may be one or more of any non-transitory storage devices suitable for storing data files or data objects in a distributed manner. For instance, the remote storage nodes may include any number of storage class memory (e.g., magneto-resistive random-access memory (MRAM), phase change memory (PCM), resistive random-access memory (ReRAM)), flash memory (e.g., solid state drive (SSD)), magnetic disks (e.g., hard disk drive (HDD)), optical disks, random-access memory (RAM), magnetic tape, and/or any other similar media adapted to store information, including software programs, data and parity information. In some embodiments, the remote storage nodes 111 may store replicated data that has been stored in the local storage system 110. The replicated data may be used for data restore and recovery when one or more storage nodes in the local storage system 110 fails.

The remote storage nodes 111 may be communicatively coupled to the local storage system 110 through a network 109.

The network 109 may be a wired or wireless computer network, such as a local area network (LAN), a wide area network (WAN) (e.g., Internet, intranet, a cloud network, etc.), cellular network, and/or other interconnected data paths across which the local storage system 110, the remote storage nodes 111, and various other devices in the computer system 100 may communicate. The network 109 may have numerous different configurations including a bus configuration, a star configuration, token ring configuration, or other configurations. In some embodiments, the network 109 may be a peer-to-peer network.

Data may be transmitted via the network 109 using various wired or wireless network protocols, interfaces and/or other technologies including Transmission Control Protocol/Internet Protocol (TCP/IP), User Datagram Protocol (UDP), Hypertext Transfer Protocol (HTTP), Dynamic Adaptive Streaming over HTTP (DASH), Real-Time Streaming Protocol (RTSP), Real-Time Transport Protocol (RTP), RTP Control Protocol (RTCP), Voice over Internet Protocol (VoIP), File Transfer Protocol (FTP), WebSocket (WS), Wireless Access Protocol (WAP), Universal Serial Bus (USB), IEEE 1394, Integrative Drive Electronics (IDE), Enhanced IDE (EIDE), Serial Advanced Technology Attachment (SATA), Small Computer System Interface (SCSI), Internet Small Computer Systems Interface (iSCSI), Serial Attached SCSI (SAS), PCI Express (PCIe), Fibre Channel, Remote Direct Memory Access (RDMA), Non-Volatile Memory Express (NVMe), NVMe over Fabric (NVMe-oF), or other standard or proprietary protocols, interfaces and/or technologies currently available or available in the future.

Although FIG. 1 illustrates a single network 109, in practice multiple networks 109 can connect the entities of the system 100. The network 109 may also be coupled with or include portions of a telecommunications network for sending data using a variety of different communication protocols.

The object store 115 is an information source for storing and providing access to various data objects. The object store 115 may include one or more non-transitory computer-readable mediums for storing data including different objects. In some embodiments, the objects stored in the object store 115 may be general data objects. In some embodiments, the objects stored therein may include some specifically created objects for task distribution. For instance, the stored data objects may include 0-byte objects that are specifically configured for data processing task distribution, as further described below. In some embodiments, the object store 115 may be a distributed object store, an on-premises object store, a remote object store accessible via the Internet as illustrated in FIG. 1, etc. In some embodiments, the object store 115 may be a global key-value store.

The local storage system 110 may comprise a plurality of storage nodes 107-1, 107-2, and 107-$n$ (together may be referred to as local storage nodes 107) and a plurality of system nodes 105-1, 105-2, and 105-$n$ (together may be referred to as system nodes 105), each of which is coupled with each other through a system controller 101. Although the local storage system 110 is shown in FIG. 1 with five storage nodes and four system nodes for ease of illustration, it should be noted that other embodiments of the local storage system 110 may employ any suitable quantity of storage nodes and system nodes.

The system nodes 105 are the actual processing components that contain a certain capacity in processing data processing tasks. For instance, the system nodes 105 may include one or more processors for processing data processing tasks, which may include data store and retrieval, data replication and backup, data restore and recovery, data encryption and decryption, etc. In some embodiments, a system node 105 may have a certain limitation in task processing. For instance, after a certain time/amount of task processing, a system node 105 may stop processing a task that is being processed. In some embodiments, a system node 105 may be a physical processing device. In some embodiments, a system node 105 may be a virtual machine for processing data processing tasks.

In some embodiments, the system nodes 105 in the local storage system 110 may work cooperatively to implement certain data processing tasks. For instance, at a certain time range, the plurality of system nodes 105 may be all implementing data restoration from the remote storage nodes 111 to the local storage system 110. In some embodiments, each system node 105 may work independently, and thus different system nodes 105 may process different tasks. For instance, one system node 105-2 may be implementing garbage collection, while another system node 105-3 may be implementing data read request from a client.

In some embodiments, different system nodes 105 may have different configurations. For one example, one system node 105-1 (may be also called "assignor") may be configured to manage task distribution among the plurality of system nodes 105, while the other system nodes 105-2 to 105-$n$ (may be also called "worker") may be configured to execute task processing (e.g., data restore and recovery). In some embodiments, the assignor system node 105-1 may be also configured to execute task processing besides the task distribution management, to improve the task processing capacity of the local storage system 110.

In some embodiments, the system nodes 105 may coordinate their actions with the actions of the other components in the computer system 100, such as the object store 115 and the remote storage nodes 111, in performing the various data processing tasks as described below.

The system controller 101 manages the operation of and/or provides an external interface to (e.g., for communication with the host computers (not shown)) the system nodes 105, the local storage nodes 107, and the remote storage nodes 111. For example, the system controller 101 coordinates various operations between the system nodes 105, the local storage nodes 107, and remote storage nodes 111, including data redundancy and/or recovery, storage device rebuild, and/or garbage collection. In addition, in some embodiments, the system controller 101 may coordinate communications between the local storage system 110 and the host computers and user devices (not shown), including forwarding read or write requests received from the clients to the corresponding local storage nodes 107 and further in the remote storage nodes 111, and retrieving data from the local storage nodes 107 and/or remote storage nodes 111 in a logical manner (e.g., blocks may be assembled into a stripe) before being returned to the clients. In some embodiments, the system controller 101 may be a Non-Volatile Memory Express (NVMe) controller. In some embodiments, the functions of the system controller 101 may be incorporated into one or more system nodes 105.

The local storage nodes 107 may be a volatile or non-volatile non-transitory memory device with suitable characteristics, such as flash memory (e.g., solid-state drive (SSD)), persistent memory (PM), and/or hard disk media including shingled magnetic recording (SMR) disks, hybrid storage devices, etc. The storage nodes 107-1, 107-2, and 107-$n$ may be communicatively coupled to each other and to the system nodes 105 through a transport medium, such as an internal fabric based on Ethernet, InfiniB and, PCIe, NVMeOF, etc.

In some embodiments, a local storage node 107 may include a device controller and a storage medium (not shown). The device controller may comprise one or more computing devices and/or software (collectively referred to as "logic" in the present disclosure) configured to manage the operation of the storage medium and provide an external interface to the respective storage device. In some embodiments, these operations may include performing peer-to-peer communications (e.g., peer-to-peer data transfers) with remote storage nodes 111 or with other storage nodes in the local storage system 110. The storage medium may comprise one or more volatile or non-volatile memory media, such as the storage devices described herein, which may have physical or logical portions for storing data, such as dies, disks, memory cells, sectors, and/or pages. In some embodiments, data may be organized in the storage medium of each storage node in the form of one or more blocks. Further, the blocks may be written to the storage nodes in the form of stripes using a suitable data structuring methodology such as log-structuring.

In some embodiments, the computer system 100 may be configured to restore/recover a large amount of data (e.g., gigabytes, terabytes, petabytes) from the back-up remote system nodes 111 to the local storage nodes 107 to restore/recover data for the local storage node(s) 107 when one or more local storage nodes 107 fail or dysfunction. During the restoring process, the assignor system node 105-1, in combination with the worker system nodes 105-2 to 105-$n$, may control the assignment/reassignment of data restoring-related tasks among the cluster of worker system nodes 105 with the data processing capacities. The specific details of the task distribution/re-distribution among the cluster of worker system nodes may refer to the descriptions in FIGS. 2-7.

Figure 2:
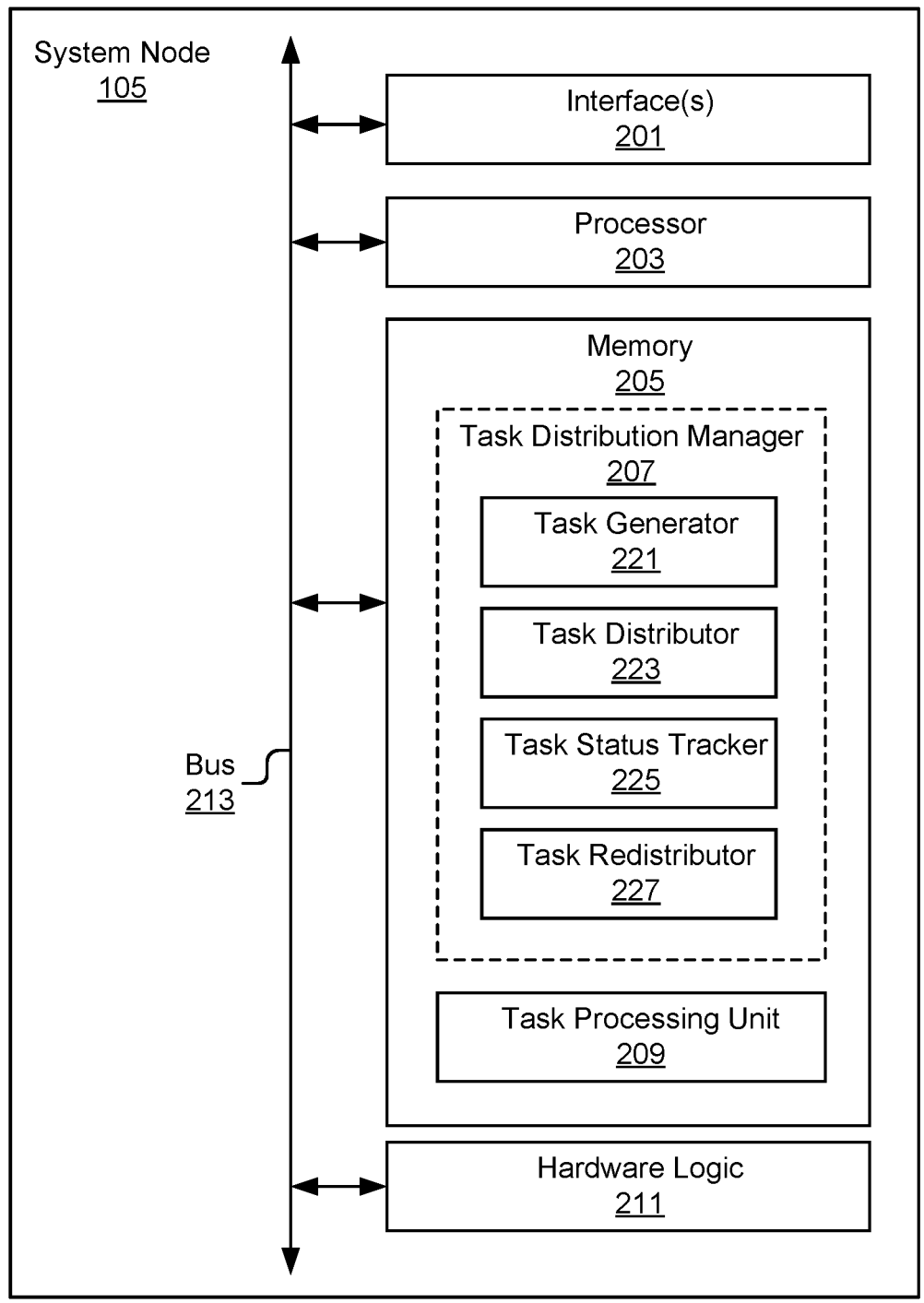
FIG. 2 depicts a block diagram of an example system node for a local storage system.

FIG. 2 depicts a block diagram of an example system mode 105 shown in FIG. 1. As shown in the figure, a system node 105 may comprise, among other components, one or more interface(s) 201, a processor 203, a memory 205 containing software, firmware and/or data including, but not limited to, a task processing unit 209, and optionally, a task distribution manager 207. A bus 213 may be used to communicatively couple the various components of the system node 105. It should be noted that the system node 105 may include alternative, additional and/or fewer components depending on the configuration, such as configurations combining elements, implementing elements in hardware vs. software, etc. For instance, as discussed elsewhere herein, among the plurality of system nodes 105, there may be only one system node 105 that comprises the task distribution manager 207.

The one or more interface(s) 201 may communicatively couple the system node 105 to a host computer (not shown) and the other components of the computer system 100, including the local storage nodes 107, the remote storage nodes 111, as well as the object store 115. The one or more interface(s) 201 may include, but are not limited to, input/output (I/O) interface circuitry that uses appropriate communications protocol(s) for communicating with the host, the local storage nodes 107, the remote storage nodes 111, and the object store 115.

A processor 203, which may include one or more processing units, may be used to execute the instructions of various software programs contained in the memory 205. The processor 203 may include one or more processing units and/or cores, programmable integrated circuits such as application-specific integrated circuits (ASICs) or field-programmable gate arrays (FPGAs), or some combination thereof. The processor 203 may be based on various computing architectures including a complex instruction set computer (CISC) architecture, a reduced instruction set computer (RISC) architecture, or an architecture implementing a combination of instruction sets. It should be understood that other configurations of the processor 203 are possible.

A memory 205, which may include one or more non-transitory storage devices, may store software programs, firmware and/or data that are executed or otherwise processed by the processor 203. The memory 205 may comprise, for example, volatile memory such as dynamic random-access memory (DRAM) device(s), static random-access memory (SRAM) device(s), non-volatile memory such as electrically erasable programmable read-only memory (EEPROM) or flash memory devices, a combination of the foregoing, and/or some other suitable type of data storage medium.

A task distribution manager 207 contained in memory 205 may include routines and/or instructions that when executed by the processor 203 may perform one or more of various data processing task distribution among the cluster of storage nodes 105, including operations relating to task assignment, task status tracking, and task reassignment for partially done tasks and/or abandoned tasks.

As shown in FIG. 2, the task distribution manager 207 may include a task generator 221, task distributor 223, heart-beat based task status tracker 225, and task re-distributor 227, each of which may implement different functions in the task distribution/re-distribution process. In some embodiments, the components 221, 223, 225, and 227 of the task distribution manager 207 may include software and/or logic to provide the acts and/or functionality they perform. In some embodiments, the components 221, 223, 225, and 227 may be implemented using programmable or specialized hardware including an FPGA or an ASIC. In some embodiments, the components may be implemented using a combination of hardware and software executable by the processor 203. In some embodiments, the components 221, 223, 225, and 227 are instructions executable by the processor 203. In some implementations, the components 221, 223, 225, and 227 are stored in the memory 205 and are accessible and executable by the processor 203.

The task generator 221 includes software and/or hardware logic executable by one or more computing devices (e.g., processor 203) to generate data processing tasks. These data processing tasks may include a large variety of tasks that are relevant to data storage and data processing. For instance, these data processing tasks may include tasks for data replication and backup, data restore and recovery, data encryption and decryption, etc. These data processing tasks may be generated in advance and save for later processing or regular processing, or they may be generated at run-time. For instance, the data processing tasks generated by the task generator 221 may include tasks, generated run-time, for restoring data objects from the remote, cloud-based storage nodes 111 to the local storage nodes 107.

In some embodiments, the tasks generated by the task generator 221 may be in a predefined format that is recognizable by other components in the local storage system 110, for instance, by the task distribution manager 221, or by the worker system nodes 105. For instance, each of the generated tasks may have a unique identification number, which allows identification of task type or data object(s) associated with each task.

In some embodiments, the task generator 221 may generate a task based on an existing task. For instance, the task generator 221 may generate a data processing task by copying an existing task and defining a different starting position for the newly generated task.

The task distributor 223 includes software and/or hardware logic executable by one or more computing devices (e.g., processor 203) to distribute the generated tasks among the worker system nodes 105 based on a scheduling or placement policy. A scheduling or placement policy may factor in CPU and memory utilization of each worker node, for balancing the use of computing resources in a shared environment. In some embodiments, the task distributor 223 may communicate with the system controller 101 in the local storage system to obtain the performance metrics of each worker system node 105 and determine to assign a data processing task based on the resource metrics of each worker system node 105.

In some embodiments, the task distributor 223 may directly query each of the clusters of worker system nodes 105 to determine its status and availability for processing additional data processing tasks. For instance, as discussed in more details in FIG. 5, the task distributor 223 may implement a remote procedure call to query whether a worker system node is able to accept a task or not.

The task status tracker 225 includes software and/or hardware logic executable by one or more computing devices (e.g., processor 203) to track each task being processed by the cluster of worker system nodes 105. By tracking each task assigned to the worker system nodes, the task status tracker 225 may ensure that each task is taken care of by the corresponding worker system node. In case that a task is not finished as expected, the task may need to be reassigned to the same or different worker system node to allow further processing of the task.

In one embodiment, the task status tracker 225 may track each task based on a heartbeat mechanism/protocol. Compared to the conventional heartbeat mechanism that mainly monitors normal operation of certain parts of a computer system, the present disclosure provides a novel heartbeat mechanism that introduces a novel status object for exchanging information about the status of a task being processed by a worker system node.

A status object is a data object configured to allow tracking of a task status/process by using a heartbeat mechanism. A status object for a task generally includes three markers—start marker, current marker, and end marker in the metadata of the object. A start marker in the status object generally indicates the position where the task begins. A fresh task has an empty string (" ") as the start marker. A current marker is an identifier that tells how much progress has been achieved for the respective task. On the other hand, an end marker is an identifier that tells the end offset for that task. In some embodiments, if an end-offset is unknown, the end marker is marked as an empty string. Through the heartbeat mechanism, the task status tracker 225 may determine the task status of a processed task based on the information of the markers obtained from the metadata of the status object. More details about the status object-based task status determination is provided with reference to FIG. 5.

The task re-distributor 227 includes software and/or hardware logic executable by one or more computing devices (e.g., processor 203) to re-distribute a task that has not completely processed (partially done or abandoned, as further described in detail with reference to FIG. 5) in the previous processing. This kind of task may be put into a to-be-assigned task list. As discussed elsewhere herein, a task list includes a list of tasks that will be assigned to the system nodes 105 by the task distribution manager 207. More details about the task list is provided with reference to FIG. 3.

In some embodiments, relevant tasks may be derived or split from the same job/service request and assigned to the worker system nodes at about the same time when these tasks are initially assigned. For instance, genomic DNA data (which may be as large as 250 GB) restoration may be split to a few relevant data restoring tasks. In the case that some of these relevant tasks are not completely processed after the initial assignment, these relevant tasks may need to be reassigned as soon as possible. To ensure the relevant tasks to be processed in a short time range, the task re-distributor 227 may have a priority to utilize the processing resources of the worker system nodes 105, to help ensure that the to-be-reassigned tasks have a priority to be processed. Accordingly, a task list prepared for the task re-distributor 227 may be assigned to the cluster of worker system nodes 105 ahead of other task lists that contain "fresh task" (i.e., the list of tasks that have not been assigned to the worker system nodes before).

In some embodiments, the task re-distributor 227 and the task distributor 223 may be combined into the same task distributor that is responsible for the task lists with or without partially done or abandoned tasks. In that case, a task list that contains partially done or abandoned tasks may still have the priority when compared to task lists that contain merely fresh tasks. In some embodiments, since there is only one task distributor, there may be only one task list at any moment. In that case, the single task list will have a priority to take the partially done or abandoned tasks before adding any fresh task into the task list.

The task processing unit 209 may be provisioned to execute tasks that deliver data processing services, such as data restoring and recovery from remote storage nodes 111 to the local storage nodes 107.

In some embodiments, the task processing unit 209 may be a physical task processing unit or a virtual task processing unit. In some embodiments, all the processing units 209 in the cluster of worker system nodes 105 may be managed by the task distribution manager 207. The task distribution manager 207 is configured to dynamically distribute the workload (i.e., a list of the tasks) over the worker system nodes 105. The task distribution manager 207 may receive processing requests from a host computer through the system controller 101, and distribute the processing requests to the processing units 209 included in the cluster of worker system nodes 105. The details for the distribution of the tasks included in the processing request to the processing units 209 will be described in more details in FIG. 3.

In some embodiments, one or more hardware logic module(s), such as ASICs, FPGAs, etc., may be employed in place of, or as a supplement to, the software and/or firmware in the memory 205 to perform one or more of the aforementioned functions provided by the task distribution manager 207 and/or the task processing unit(s) 209.

Figure 3:
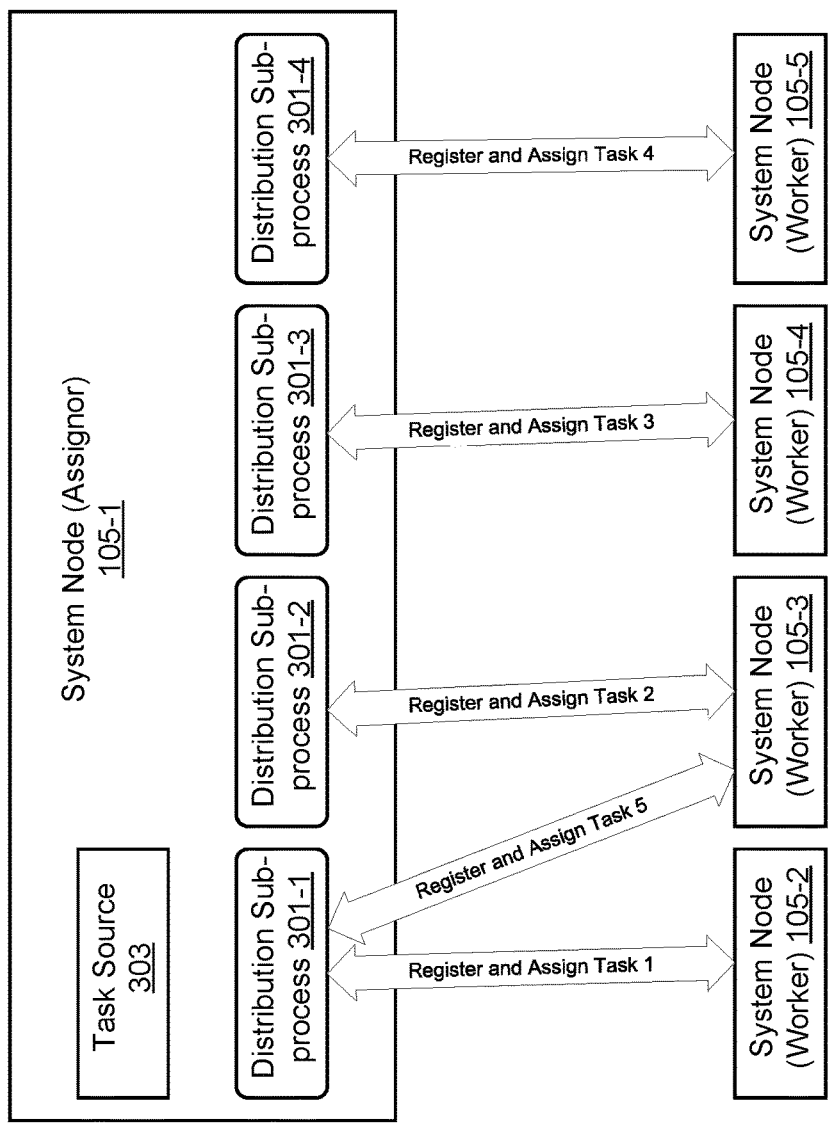
FIG. 3 depicts a flow diagram of an example assignment of a number of tasks among a set of system nodes.

FIG. 3 depicts a flow diagram of an example of the task distribution process. As shown in the figure, there is an assignor system node 105-1 that manages the assignment of a plurality of tasks to the cluster of worker system nodes 105-2 to 105-5.

In the disclosed embodiment, the assignor system node 105-1 includes a task source 303 that stores tasks that are to be assigned by the assignor system node 105-1. The tasks maintained in the task source 303 may include the tasks that are generated run-time by the task generator 221 and the partially done tasks and abandoned tasks that are identified by the task status tracker 225. In some embodiments, the task source 303 may also include one or more task lists that are generated by the task distributor 223 and/or task re-distributor 227. The number and length of task lists included in the task source 303 may vary greatly, according to the settings and performance of the worker system nodes 105 in the local storage system 110.

In some embodiments, the length of a task list (numbers of tasks included in a list) conforms to the processing resource of the worker system nodes 105 in the local storage system 110. The processing resource of the worker system nodes may greatly rely on the number of worker system nodes 105 in the local storage system 110. Accordingly, if there is P number of worker system nodes, the length of a task list may be set to P.

In some embodiments, the length of a task list may also be modified according to an overload factor F. An overload factor is a factor set to enhance workload on a worker system node 105-$n$ during the task assignment. The overload factor generally has a value larger than, or at least equal to, 1. The overload factor F may be configured for different reasons. In one aspect, by introducing an overload factor, more than one task will be assigned to a worker system node. This may ensure that each worker system node has enough task to process but does not wait for the task assignment, especially if the task assignment process is long or the task processing process takes a really short time. In another aspect, by introducing an overload factor, the efficiency of the whole task assignment process may be enhanced. The task assignment/reassignment process takes time to process. By assigning multiple tasks instead of just one task, the task assignment efficiency may be improved. For instance, if two tasks, instead of one, will be assigned to each worker system node (i.e., F=2), the overall task assignment process may take less time. This advantage is even more pronounced the larger the number of tasks that are assigned and further processed (e.g., in the data restoring and recovery process).

In some embodiments, the computing power of a processing unit in a worker system node may also necessitate an overload factor. For example, a processing unit in a worker system node 105 may include multiple cores which makes the simultaneous processing of multiple tasks in parallel feasible and optimal. Accordingly, by introducing an overload factor to match the processing capacity of the worker system node 105, the performance of a worker system node will turn into the utmost.

If the overload factor is the same for all the worker system nodes, the length of a task list will be F*P. However, in some embodiments, different worker system nodes 105 may have different overload factors set for each node. For instance, due to the different processing resource and performance, one worker system node may have a higher overload factor F when compared to another worker system node 105. Accordingly, the length of a task list will be $\Sigma_n{}^n F_i * P_i$, where i is the i-th worker system node in the cluster of worker system nodes 105. For one instance, there are four worker system nodes 105-1 to 105-4. Worker system node 105-2 has an overload factor of 2, while the other worker system nodes have an overload factor of 1. Then, the length of the task list determined for the cluster of worker system nodes shown in FIG. 5 is five. Accordingly, there are five tasks that may be assigned to the four worker system nodes 105-2 to 105-5. As shown in the figure, Task 1 is assigned to the worker system node 105-1, Task 2 and Task 5 is assigned to the worker system node 105-2, Task 3 is assigned to the worker system node 3, while Task 4 is assigned to the worker system node 4.

As illustrated in FIG. 3, the assignor system node 105-1 may also include a number of distribution sub-processes. Since the local storage system 110 includes multiple system nodes 105, the task distribution may take a long time if the tasks are assigned to these system nodes 105 one after another. To accelerate task distribution, the assignor system node 105-1 may introduce a plurality of distribution sub-processes. Each of these distribution sub-processes may run independently and in parallel in task distribution, and thus the overall task distribution process may take much less time when compared to task distribution one after another among the multiple system nodes 105. In some embodiments, the number of distribution sub-processes included in the assignor system node 105-1 matches the number of worker system nodes 105 in the local storage system 110. In some embodiments, more or fewer distribution sub-processes may be included in the assignor system node 105-1.

In some embodiments, as illustrated by the text inside the arrows in FIG. 3, before the task distribution process, there is also a registration process for a to-be-assigned task. More details for the registration process will be proved in FIG. 5.

Figure 4:
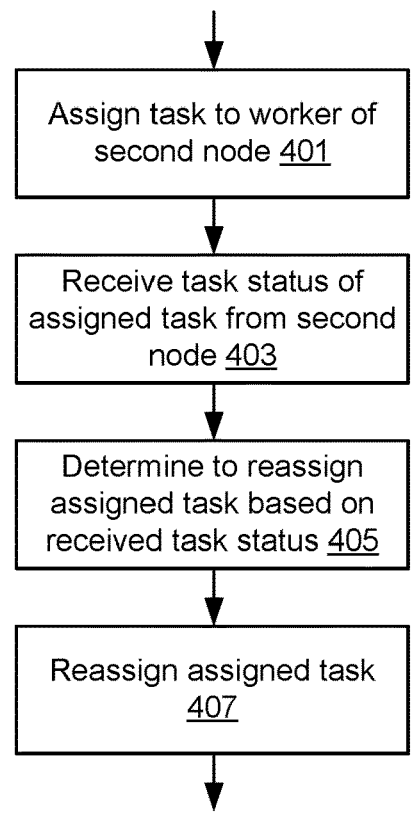
FIG. 4 depicts a flowchart of an example method for assigning and reassigning a partially done task.

FIG. 4 depicts a flowchart of an example method for assigning and reassigning a data processing task to a worker system node 105-$n$ by the assignor system node 105-1.

At step 401, the assignor system node 105-1 (may be also called "the first node" hereinafter) assigns a data processing task to a worker system node 105-$n$ (may be also called "second node" hereinafter). The data processing task may be assigned to the second node according to certain policy and principle as previously discussed. Upon the assignment, the second node may begin to process the assigned task, which may be a task to restore data (e.g., data objects) from the remote storage nodes 111 to a local storage node(s) 107.

At step 403, the first node receives the task status of the assigned task reported by the second node. During the task processing, the second node may periodically update the status of the task processing by using a status object-based heartbeat mechanism, where the status object has a start marker, current marker, and end marker for indicating a starting point, a current point, and an expected ending point of task processing, as further described in more details in FIG. 5. The updated task status may be tracked by the first node by using the same or different heartbeat mechanism. After a certain limit of task processing is reached in the second node, the second node may end the processing of the assigned task. At this moment, the assigned task may or may not have been finished processing, depending on the workload of the task or other factors.

At step 405, the first node determines whether to reassign the previously assigned task based on the task status reported by the second node. If it is determined that the assigned task is only partially complete by the second node, the first node may determine to reassign the previously assigned, partially complete task.

At step 407, the first node reassigns the partially completed task to a worker system node, which may be the same second node or another different worker system node 105. The reassigned task may use the ending position of the previous task processing as the starting position for further task processing. In this way, the reassigned task may resume the task processing without repeatedly processing a portion of the task that has been previously processed.

The foregoing description is merely a brief description of the task distribution/re-distribution process according to one embodiment of the present disclosure. A more detailed description may refer to FIG. 5.

Figure 5:
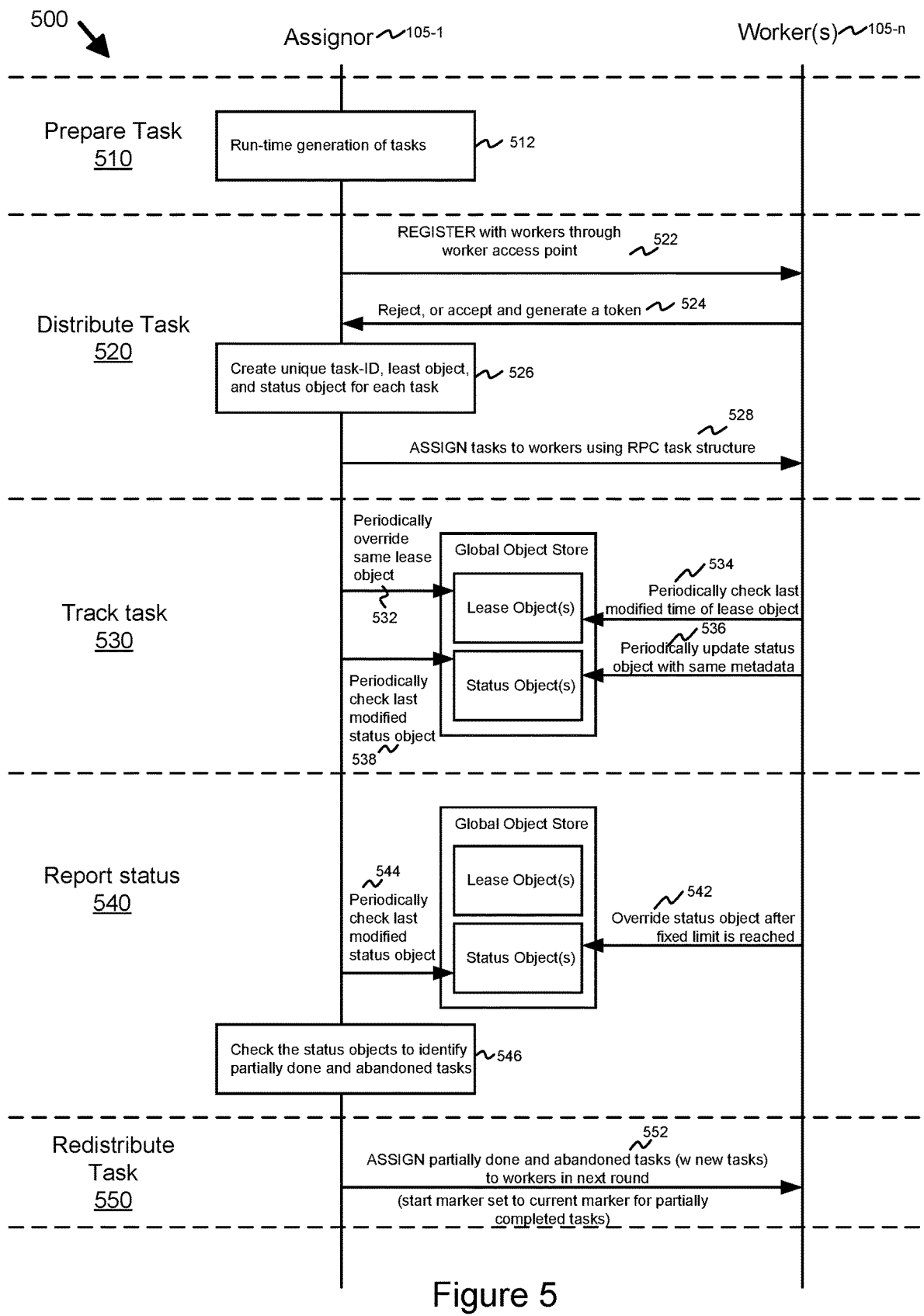
FIG. 5 depicts a flow diagram of an example method for task assignment, processing, tracking, and reassignment.

FIG. 5 depicts a flow diagram of an example method for task assignment, processing, tracking, and reassignment. As illustrated in the figure, the method 500 includes five different stages: prepare task 510, assign task 520, track task 530, report status 540, and reassign task 550. It should be noted that the five different stages are divided merely for illustrative purpose. Different stages may be combined into one stage, or a specific stage may be further split into additional sub-stages. For instance, the track task 530 stage and the report status 540 stage may be combined into one stage. In addition, for some specific data processing tasks, fewer stages or only certain steps of the five stages may be conducted, as further described in details below.

In the prepare task 510 stage, one or more tasks may be generated at run-time. The tasks may be generated by the task generator 221 of the assignor system node 105-1 at run-time. For instance, when restoring a failed storage system, one or more tasks for restoring objects from a remote storage system to a local storage system may be generated at run-time. A task may be generated for restoring one data object, or a part of a data object, or even multiple data objects in a single task. To restore a failed storage system, there might be numerous data objects to be restored. Accordingly, there might be numerous tasks to be generated from the data restoring process. These tasks may be generated by the task generator one-by-one and processed immediately after the generation. In certain circumstances, these tasks may be generated and temporarily stored in the task source 303 of the assignor system node 105-1 for a certain period of time, until a certain number of tasks have been generated, until certain time elapses, or until these tasks have been assigned to certain worker system nodes.

In the distribute task stage 520, the one or more generated tasks may be distributed to the plurality of worker system nodes 105. The whole distribution process may be divided into a plurality of distribution sub-process, as previously described in FIG. 3. In some embodiments, each sub-process is responsible for distributing one or more tasks to a corresponding worker system node. In some embodiments, a distribution sub-process may distribute multiple tasks to different nodes, as also shown in FIG. 3. To assign a task to a specific worker system node, two different registration processes may be involved, as further described below.

At step 522, the worker system nodes 105 may be registered with the assignor system node 105-1 through the worker access points. In brief, to allow the assignor system node 105-1 to assign tasks to the corresponding worker system nodes 105, the corresponding worker system nodes 105 may need to first register with the assignor system node 105-1.

In some embodiments, the assignor system node 105-1 may register a list of worker system nodes 105 (e.g., statistically or dynamically). By way of non-limiting example, to get a list of worker system nodes registered statically, the assignor system node 105-1 may be given a list of endpoints of worker system nodes 105 through a parameter. In a further non-limiting example, dynamic registration may be achieved through a REGISTER operation, which may be conducted to provide a worker access point of each worker system node 105-n to the assignor system node 105-1. The worker access point is a channel through which a worker system node 105-n can listen for any communications from the assignor system node 105-1 that manages the worker system nodes 105. In one embodiment, the worker access point for a worker system node 105-n may be a combination of IP address and port of the node 105-n.

After the registration of the worker system nodes with the assignor system node 105-1, a task may be then assigned to a respective worker system node 105-n through a corresponding distribution sub-process. Specifically, each distribution sub-process may be provided with a corresponding worker access point offset(s) so that each distribution sub-process may assign a task to a corresponding worker system node, but not others, through the provided respective worker access point offset.

At step 524, the corresponding worker system node may accept or reject a task assignment from the corresponding distribution sub-process. If the worker system node 105-n accepts the assigned task, the node 105-n may generate a unique and short-lived token, which may be returned to the corresponding distribution sub-progress. If the selected worker system node 105-n rejects the task assignment, the corresponding distribution sub-progress may attempt to register with a second worker system node by circularly traveling the access point list. In this case, more than one worker access point may be provided to a distribution sub-progress.

In some embodiments, the access point list may organize the worker system nodes according to certain parameters, such as the processing capacity, idle time, etc. This may then allow the selection of a worker system node to be balanced, or a more powerful worker system node to be selected to facilitate faster processing of the to-be-assigned task. Once the worker system node is selected and the to-be-assigned task is accepted by the selected worker system node, the token generated by the selected worker system node may be noted down by the corresponding distribution sub-process.

At step 526, the assignor system node 105-1 may create a unique task identifier, a lease object, and a status object for each to-be-assigned task. As discussed earlier, the task identifier, lease object, and status object for a task may be generated at the moment of task generation, or until a to-be-assigned task is accepted by a worker system node 105-n.

The created identifier for a task is unique among all the distribution sub-processes so that when the corresponding lease object and status object stored in an object store are checked/updated by the corresponding distribution sub-process, it can be ensured that only one lease object or status object can be invoked. The created identifier for a task may be placed in the prefix of the corresponding lease object and the status object, to allow the identification of the corresponding lease object/status object during the task distribution/re-distribution process.

The created lease object and status object are 0-byte objects. A 0-byte object is used for the liveliness/task status reporting purpose because handshaking information can be stored as object metadata and HEAD-OBJECT can be used for reading without adding performance overhead of GETS. HEAD operation retrieves metadata from the lease/status object without returning the lease/status object itself. A HEAD request has the same options as a GET operation on an object. The response is identical to the GET response except that there is no response body for the request.

The created lease/status objects for the to-be-assigned tasks are stored in an object store, which may be a distributed object store, an on-premises object store, a remote object store accessible via the Internet, a global object store, etc. By placing the lease/status objects in a remote object store, these lease/status objects can be accessed from different locations with limitation, which is extremely useful for a distributed system.

Figure 6:
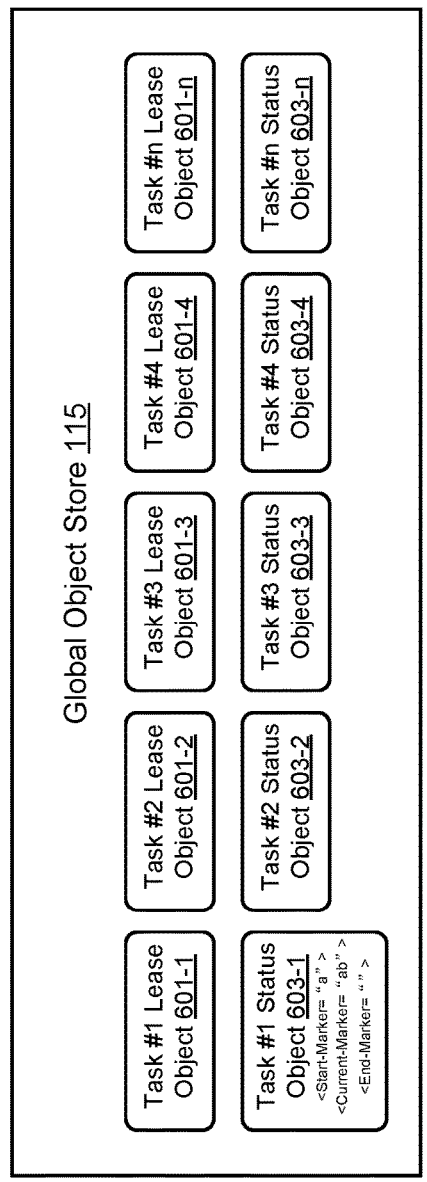
FIG. 6 depicts a block diagram of an example object store for storing lease objects and status objects.
Figure 6:

FIG. 6 shows a schematic diagram of an object store for storing lease objects and status objects for to-be-assigned tasks. As shown in the figure, the object store 115 includes a plurality of lease objects 601-1 to 601-n and the corresponding status objects 603-1 to 603-n. These lease objects and status objects include identifiers, in the prefix of each object, that uniquely identify the corresponding tasks Task

1, Task #2, . . . , Task #n. As shown in the status object 603-1 and also as discussed elsewhere herein, each status object may include additionally a start marker and end marker, and also a current marker if the corresponding task is being/has been processed Referring back to FIG. 5, after the creation of the corresponding lease and status objects and the storage of the lease/status objects in the object store 115, these tasks may be then assigned to the corresponding worker system nodes through ASSIGN operation.

At step 528, the assignor system node 105-1 may use ASSIGN operation to assign tasks to workers through an RPC task structure. An RPC task structure may include the task identifier, as well as the start marker and the end marker for a task. The ASSIGN operation may also include a token received during the registration process, where the token indicates that the worker system node accepts the to-be-assigned task. In response to the ASSIGN operation, the respective worker system node may first validate the token included in the RPC task structure, to determine whether the token is valid. If the token is invalid, the worker system node 105-n may reject the task that is being assigned. If the token is valid, the worker system node 105-n may accept the assigned task, and proceed to process the assigned task. In some embodiments, even if the token is valid, the worker system node 105-n may still reject the assigned task. This could be due to some internal change inside the worker system node (e.g., physical service interruption, temporary system failure, etc.), which prevents the worker system node from processing the to-be-assigned task as expected.

At the track task stage 530, the progress of an assigned task processing may be monitored. In some embodiments, the heartbeat mechanism may be employed to achieve this purpose. Step 532 and step 532 together show how a lease object may be used to monitor the liveliness of the assignor system node 105-1 by using a heartbeat mechanism, while step 534 and step 536 show how a status object may be used to track the task processing progress (i.e., the task status).

At step 532, the assignor system node 105-1 may periodically override the lease object corresponding to a task to advertise its liveliness to the worker. By overriding the lease object, the assignor system node 105-1 may replace the old lease object with a new lease object, in which the metadata is the same as the old lease object, except that the time for the new lease object is updated to reflect the time of the generation of the new lease object. Through this process, the last-modified time of the lease object is periodically changed to reflect the liveliness of the assignor system node 105-1.

At step 534, the worker system node 105-2 may periodically check the last-modified time of the lease object, to ensure that the assignor worker system is still alive and still waiting for the assigned task to be processed or finished. The worker system node 105-2 may achieve this through a HEAD operation. For instance, when the HEAD operation requests the return of the metadata for the lease object, the response for the metadata may include the time of "Last-Modified." Based on the time of "Last-Modified," the worker system node 105-n may determine whether the assignor system node 105-1 is still live by simply comparing the time of "Last-Modified" received this time and the last time. If there is no time change, it may mean that that the assignor system node might be down, or lose its connection, and the like. To save the computing resources, the worker system node 105-n may stop processing the assigned task, or even remove the relevant data for the task. However, if there is a time change, it means that the assignor system node 105-1 is still alive and thus the assigned task continues to be processed by the selected worker system node 105-n.

At step 536, the selected worker system node 105-n may periodically update the status object with the metadata when processing the assigned task. This may be also achieved by periodically updating the current marker included in the status object.

At step 538, the assignor system node 105-1 may periodically check the last modified status object. Similarly, a HEAD operation may be employed during the process (e.g., which may retrieve metadata from an object without returning the object itself). Based on the metadata of the status object, the current marker for the task status may be also determined. Accordingly, the task status of the assigned task is continuously monitored through the status object during the processing of the assigned task.

At stage 540, the task status of an assigned task may be determined at the end of the task processing. In general, a worker system node is programmed to run for a certain/fixed limit. This limit can be either the amount of work that has been processed by the worker system node or the amount of time that elapses. After the fixed limit is reached, the worker system node may stop processing any work, even the work (e.g., the assigned task) currently being processed, which then leaves some assigned tasks partially done.

To determine whether the fixed limit is reached, the assignor system node 105-1 may check the liveliness of a worker system node by checking the "Last-modified" time of status object updated by the worker system node 105-n, in a manner similar to the determination of the liveness of the assignor system node 105-1 as described above. Repeated checking the "Last-modified" time of the status object may tell whether the task is still being processed. If the task is not being processed anymore (e.g., due to the reached fixed limit), the task status of the task may be then determined.

In some embodiments, besides the start marker, the current marker, and the end marker, the metadata of a status object may also include "STATUS" information in the metadata. The "STATUS" information may be overridden by a worker system node after the fixed limit of task processing is reached. Based on the "STATUS" information, it may be also determined whether the fixed limit is reached.

At step 542, the worker system node 105-n may override the status object of the task after the fixed limit is reached. By overriding the status object, the worker system node 105-n provides a final update on the metadata of the status object after the fixed limit is reached. If the worker system node 105-n finishes the work within the fixed limit, the worker system node 105-n overrides the status object with metadata "STATUS" as "DONE." At the same time, the worker system node 105-n may also set the current marker and the end marker to the end offset of the task. If the worker system node 105-n cannot finish the task within the fixed limit, the worker system node 105-1 may still override the status object with the metadata "STATUS" as "DONE." However, instead of the setting the end marker to the end offset of the task, the end marker is set as an empty string at this moment. Also, the current marker is not set to the end offset either, but rather to a point where the task has been stopped.

At step 544, the assignor system node 105-1 may still periodically check the last modified status object, even for the final update of the status object after the fixed limit is reached. In some embodiment, the assignor system node 105-1 may notice that the fixed limit for the selected worker system node 105-n has been reached based on the metadata "STATUS" tracked during the periodical heartbeat communication process. Accordingly, the assignor system node 105-1 may stop tracking the task processing process and determine to collect the metadata with "STATUS" as "DONE" to further determine whether the assigned task has finished processing or not.

At step 546, the assignor system node 105-1 may identify partially done and abandoned tasks based on the status object overridden or updated by the worker system node 105-n. If the status object has the "STATUS" metadata as "DONE," the assignor system node then compares the end marker and the current marker. If the end marker and the current marker are the same, it may be determined that the assigned task is completely done by the worker system node 105-n. The task may be then removed from the task list. If the end marker and the current marker are not the same, it may be considered that the assigned task is partially done by the worker system node 105-n. At this moment, the assignor system node 105-1 may note down the current marker and regenerate a new copy of the task entry for adding to a task list. In the new copy of task entry, the start marker is not empty string as the fresh task, but rather is set to a point/location where the task has been stopped (i.e., the previous current marker noted down by the assignor system node 105-1). If the status object is not marked as "DONE," and has not been touched for a certain interval, it may be considered that the selected worker system node 105-n has not touched the assigned task for certain reasons (e.g., the worker system node 105-n is down or has lost connection). The assigned task at this situation may be also called as "abandoned tasks," which may be also added to the task list as partially done tasks.

Figure 7:
FIG. 7 depicts a flow diagram of an example of a change of markers in a status object after a certain period of task processing.

FIG. 7 depicts a flow diagram showing the outcome of an assigned task after the fixed limit is reached. As illustrated in the figure, the start marker and end marker of a fresh to-be-assigned task may be set as the empty string and the end offset of the task (e.g., "a") at the beginning. After the fixed limit is reached, the current marker and the end marker may be updated to reflect the process of the task processing. For one example, the current marker may have been overridden/updated to the end offset "a" by the worker system node 105-n. By comparing the current marker and the end marker, it may be found that the current marker and the end marker are now the same. Accordingly, the task may be considered as "Completely Done." For another example, the current marker may have been updated/overridden by the worker system node to "ab," which is different from the end marker, or even the start marker. By comparing the current marker and the end marker, it may be found that the current marker is different from the end marker. Accordingly, the task may be considered as "Partially Done." In yet another example, the current marker may have not been updated/overridden throughout the period of the fixed limit. Accordingly, the current marker may be left empty without any information, or remain to be the same as the start position of the fresh task. It may be then determined that the assigned task is abandoned by the selected worker system node 105-n. The assigned task may be then considered as "Abandoned," which is then reassigned again in the next sound of task distribution.

Referring back to FIG. 5, at the re-distribute task stage 550, the partially done and/or abandoned tasks are reassigned by the assignor system node 105-1 at step 552.

The task reassignment process may be similarly processed by the assignor system node 105-1. Specifically, a list of partially done tasks and abandoned tasks may be reassigned among the worker system nodes 105. The list of partially done tasks and abandoned tasks may be generated at stage 540 and saved in the task source 303 of the worker system node 105-1. To re-distribute the tasks in the task source 303, the task re-distributor 211 may generate a task list that includes partially done or abandoned tasks. In certain circumstances, there might be fewer partially done and abandoned tasks in the list when compared to the number of available worker system nodes. In this situation, the task re-distributor 211 may further check the remaining fresh tasks in the task source 303, and adds a certain number of fresh tasks into the task list so that every worker will have one or more assigned tasks to process.

In some embodiments, the assignor system node 105-1 may crash or need to restart for certain reasons. To maintain the consistency of the task processing among the plurality of worker system nodes 105, the worker system node 105-1 may restart from the last recorded state. At the same time, while the assignor system node 105-1 is shut down, the worker system nodes may detect that the assignor system node 105-1 has lost its liveliness and is not in service as the lease object(s) has not been further updated. At this moment, the worker system nodes may determine to stop working on the assigned task, to save the energy and resources for other data processing tasks.

Methods and systems for adaptive distribution of tasks among a plurality of distributed system/processing nodes are described above. Technical features and advantages of one or more embodiments of the present disclosure as described above may include, but are not limited to, one or more of the following:

(1) Improved adaptiveness of task distribution in the case of a partially done data processing task. The present disclosure improves system performance by reassigning partially done tasks, to allow a partially done task to resume the processing from the point where the previous processing ends, rather than from the beginning of the task (per conventional systems). By using the adaptive distribution described in the present disclosure, a distributed system may avoid repeated processing of a previously processed portion of a task, which saves the processing resources of the distributed system.

(2) Improved efficiency in handling a big list of tasks and long duration tasks. For a big list of tasks or long duration tasks, they generally take a longer time to complete the task. Accordingly, when a processing unit reaches a certain limit and stops processing tasks, the big list of tasks and long duration tasks will more likely face a risk of not being completely processed, and thus end with the tasks being partially done. Since these tasks generally take longer time and more resources to process even a portion of the tasks, resuming the task processing of these tasks by restarting from the fresh will leave the previous processing wasted, which is really undesirable, especially when there is a large number of tasks waiting for processing (e.g., during data restore or recovery after failure of storage nodes). By using the adaptive distribution in the present disclosure, it can be ensured that the previous processing of a task is not wasted, and thus time and resources may be saved in processing these tasks.

(3) Improved efficiency for a worker to handle assigned tasks. By enabling more than one task, instead of only one task (per conventional systems), to be processed simultaneously in an individual worker, the efficiency of an individual worker is greatly improved.

Methods and systems for adaptive distribution/re-distribution of data processing tasks in a distributed system are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment" or "one embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, for example, but is not limited to, any type of disk including floppy disks, optical disks, CD ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of a hardware implementation, a software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies are intended to be illustrative, but not limiting.

What is claimed is:

1. A distributed system, comprising:
   a cluster of nodes that includes a first node and a second node, wherein each node of the cluster of nodes includes a processor and a memory; and
   a task distribution manager associated with the first node, wherein:
   the second node includes a worker configured to perform data processing tasks; and
   the task distribution manager is configured to:
   create a status object for a task, wherein the status object for the task includes a start marker, a current marker, and an end marker for the task;
   assign the task to the worker of the second node;
   after a first period of time, query the status object for a task status of the assigned task reported by the second node, wherein the task status indicates a status of execution of the assigned task by the second node;
   determine to reassign the assigned task based on a received task status reported by the second node; and
   reassign the assigned task.

2. The system of claim 1, wherein the status object for the task further includes a task identifier for the assigned task in a prefix of the status object.

3. The system of claim 1, wherein:
   the start marker is an empty string that indicates where the assigned task starts;
   the current marker indicates a point to which the worker has completed the task when the status object is queried; and
   the end marker indicates an end offset of the task.

4. The system of claim 1, wherein the task status of the assigned task is determined based on a comparison of the current marker and the end marker after the first period of time.

5. The system of claim 1, wherein, when reassigning the assigned task, the task distribution manager is further configured to regenerate a copy of the assigned task, wherein a start marker for the regenerated copy of the assigned task is set to the current marker of the assigned task after the first period of time.

6. The system of claim 1, wherein the task distribution manager is further configured to:
   create a task identifier for the assigned task; and
   create a lease object that includes the task identifier in a prefix of the lease object.

7. The system of claim 6, wherein the task distribution manager is further configured to periodically override the lease object to advertise a liveliness of the task distribution manager to the second node.

8. The system of claim 6, wherein the lease object and the status object are 0-byte objects stored in an object store.

9. The system of claim 1, wherein, to query the status object for the task status of the assigned task reported by the second node, the task distribution manager is further configured to:
   periodically check a latest modification of the status object that has been periodically modified by the second node.

10. The system of claim 1, wherein the task distribution manager is further configured to assign a second task to the worker of the second node after assigning the task to the worker of the second node.

11. A computer-implemented method, comprising:
    creating, by a processor in a first node, a status object for a data processing task;
    creating a task identifier for the data processing task;
    creating a lease object that includes the task identifier in a prefix of the lease object;
    assigning, by the processor in the first node, the data processing task to a worker of a second node;
    after a first period of time, querying, by the processor in the first node, the status object for a task status of the assigned data processing task reported by the second node, wherein the task status indicates a status of execution of the assigned data processing task by the second node;
    determining, by the processor in the first node, to reassign the assigned data processing task based on a received task status reported by the second node; and
    reassigning, by the processor in the first node, the assigned data processing task.

12. The computer-implemented method of claim 11, wherein the status object for the data processing task includes a start marker, a current marker, and an end marker for the data processing task.

13. The computer-implemented method of claim 12, wherein:
    the start marker is an empty string that indicates where the assigned data processing task starts;
    the current marker indicates a point to which the worker has completed the data processing task when the status object is queried; and
    the end marker indicates an end offset of the data processing task.

14. The computer-implemented method of claim 12, wherein the task status of the assigned data processing task is determined based on a comparison of the current marker and the end marker after the first period of time.

15. The computer-implemented method of claim 12, wherein:
    reassigning the assigned data processing task further comprises regenerating a copy of the assigned data processing task; and
    a start marker for the regenerated copy of the assigned data processing task is set to the current marker of the assigned data processing task after the first period of time.

16. The computer-implemented method of claim 11, wherein the status object includes the task identifier in a prefix of the status object.

17. The computer-implemented method of claim 11, further comprising periodically overriding the lease object to advertise a liveliness of a task distribution manager to the second node.

18. The computer-implemented method of claim 11, wherein the lease object and the status object are 0-byte objects stored in an object store.

19. The computer-implemented method of claim 11, wherein querying the status object for the task status of the assigned data processing task reported by the second node further includes periodically checking a latest modification of the status object that has been periodically modified by the second node.

20. A system, comprising:
means for creating a status object for a task, wherein the status object for the task includes a start marker, a current marker, and an end marker for the task;
means for assigning the task to a worker of a system node;
means for querying the status object for a task status of the assigned task reported by the system node after a first period of time, wherein the task status indicates a status of execution of the assigned task by the system node;
means for determining to reassign the assigned task based on a received task status reported by the system node; and
means for reassigning the assigned task.

* * * * *